T. PARKER & J. DOWNING.
PLOW.

No. 177,955.

Patented May 30, 1876.

WITNESSES
Robert Everitt
George E. Uphaul

INVENTORS
Thomas Parker,
James Downing,
Chipman and Hosmer & Co.,
ATTORNEYS

UNITED STATES PATENT OFFICE.

THOMAS PARKER AND JAMES DOWNING, OF MENOMONEE, WISCONSIN.

IMPROVEMENT IN PLOWS.

Specification forming part of Letters Patent No. 177,955, dated May 30, 1876; application filed July 17, 1875.

*To all whom it may concern:*

Be it known that we, THOMAS PARKER and JAMES DOWNING, both of Menomonee, in the county of Dunn and State of Wisconsin, have invented a new and valuable Improvement in Plows; and we do hereby declare that the following is a full, clear, and exact description of the construction and operation of the same, reference being had to the annexed drawings, making a part of this specification, and to the letters and figures of reference marked thereon.

Figure 1:
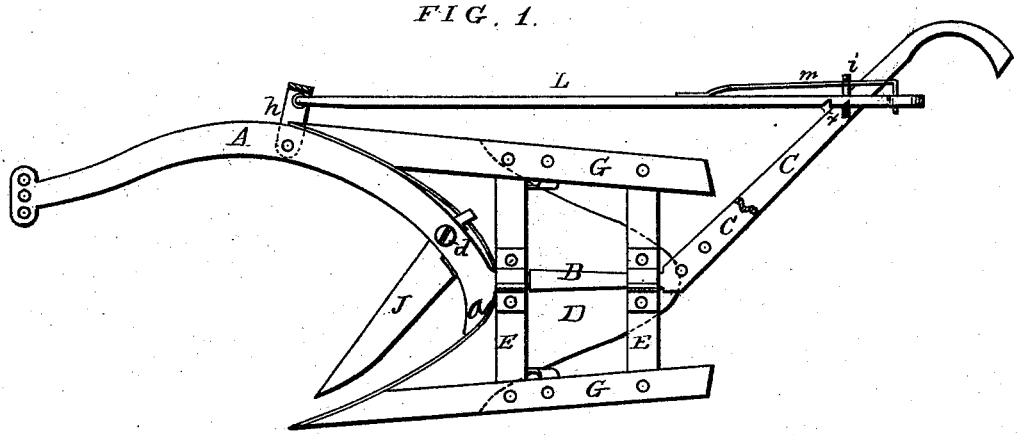
Figure 2:
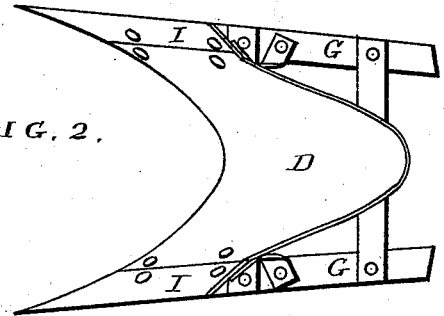
Figure 3:
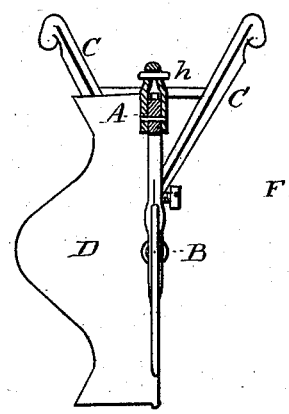

Figure 1 of the drawings is a representation of a side elevation of our plow. Fig. 2 is a plan view of the same, and Fig. 3 is a transverse vertical sectional view thereof.

Our invention is intended as an improvement upon the plow for which Letters Patent No. 157,539 were granted to Thomas Parker December 8, 1874; and it consists in the construction and novel arrangement of the mold-board and the beam with colter, as will be hereinafter more fully set forth.

In the annexed drawing, A represents the plow-beam, provided at its lower rear end with a rearward-projecting bar, B, to which the handles C C are secured. On the bar B are pivoted two arms, E E, connected at their ends by means of the land-sides G G, and having the mold-board D and shares I I secured to them to form a reversible plow. The mold-board D is made of one piece, properly shaped and bent, forming a seamless mold-board, which can be made much easier and cheaper than when made in two parts, as described in the former patent above referred to.

The beam A is curved at its rear end, and said curve $a$ extended to meet the mold-board of the lower plow, whereby it is less liable to clog when used without a colter.

J represents the colter, provided with a shank or tenon, which is passed through a mortise in the beam, and fastened by a set-screw, $d$.

The plow can easily be reversed without moving the colter, and the plow is held in position by means of a latch, $h$, pivoted to the beam, and fitting over the upper plow-point. To this latch is attached a rod, L, extending backward through a keeper, $i$, on the round that connects the two handles, where a spring, $m$, is arranged to press teeth $x$ on the rod into or against the keeper to lock the rod and prevent the latch from opening.

What we claim as new, and desire to secure by Letters Patent, is—

The curved beam A, terminating at its rear end in the horizontal bar B, and having the curved extension $a$, in combination with the mold-board of the plow, constructed as described, and for the purpose set forth.

In testimony that we claim the above we have hereunto subscribed our names in the presence of two witnesses.

THOMAS PARKER.
JAMES DOWNING.

Witnesses:
GEO. H. BARWISE,
N. B. NOBLE.